United States Patent
Takiguchi et al.

[19]

[11] Patent Number: 5,880,726
[45] Date of Patent: Mar. 9, 1999

[54] STOCK INFORMATION DISPLAY METHOD AND INFORMATION TERMINAL

[75] Inventors: Takahiro Takiguchi; Kazumasa Nakamura; Nobuhiro Takahashi; Susumu Yokoyama, all of Tokyo, Japan

[73] Assignee: Kokusai Electric Co., Ltd., Tokyo, Japan

[21] Appl. No.: 728,230

[22] Filed: Oct. 10, 1996

[30] Foreign Application Priority Data

Oct. 13, 1995 [JP] Japan .................................. 7-264228

[51] Int. Cl.⁶ ..................................................... G06F 3/00
[52] U.S. Cl. ............................................. 345/340; 705/10
[58] Field of Search ..................................... 345/333, 334, 345/339, 340, 342, 343, 346, 962, 968; 340/825.26; 273/278; 705/10, 35, 36, 37, 400, 411

[56] References Cited

U.S. PATENT DOCUMENTS

| | | | |
|---|---|---|---|
| 4,785,296 | 11/1988 | Tabata et al. | 345/129 |
| 5,270,922 | 12/1993 | Higgins | 703/37 |
| 5,712,658 | 1/1998 | Arita et al. | 345/158 |

FOREIGN PATENT DOCUMENTS 4269786  2/1991  Japan .

OTHER PUBLICATIONS

"Boston Exchange Looks to Unix," Unix Today, 5 Aug. 1991 p. 44.

Middleton, T., "Look closely at mutual funds; . . . ," Computer life, V2, N2, p. 143(3), (Feb. 1995).

*Primary Examiner*—A. Katbab
*Attorney, Agent, or Firm*—Jacobson, Price, Holman & Stern, PLLC

[57] ABSTRACT

A stock information display method wherein, when a screen pattern and a stock are entered, stock information regarding the entered stock on display types specified by the entered screen pattern is displayed in accordance with a division pattern designated by the screen pattern. An information terminal wherein an auxiliary memory is equipped with a linkage registration table for storing, as screen patterns, a plurality of screen division patterns and the types of information to be displayed at respective display locations on a divided screen. When a screen pattern and a stock are entered, a controller reads from a main memory the stock information regarding the entered stock on the display types corresponding to the entered screen pattern, creates display data in accordance with a format of the division pattern which corresponds to the screen pattern, and supplies the created data to a display unit. The stock information display method and the information terminal enable a plurality of types of stock information to be displayed on the same screen, thus achieving easier input operation.

4 Claims, 8 Drawing Sheets

FIG.2A

SCREEN PATTERN 1

| STOCK |
|-------|
| CB    |

FIG.2B

SCREEN PATTERN 2

| STOCK   | CB                   |
|---------|----------------------|
| FINANCE | SETTLEMENT OF ACCOUNTS |

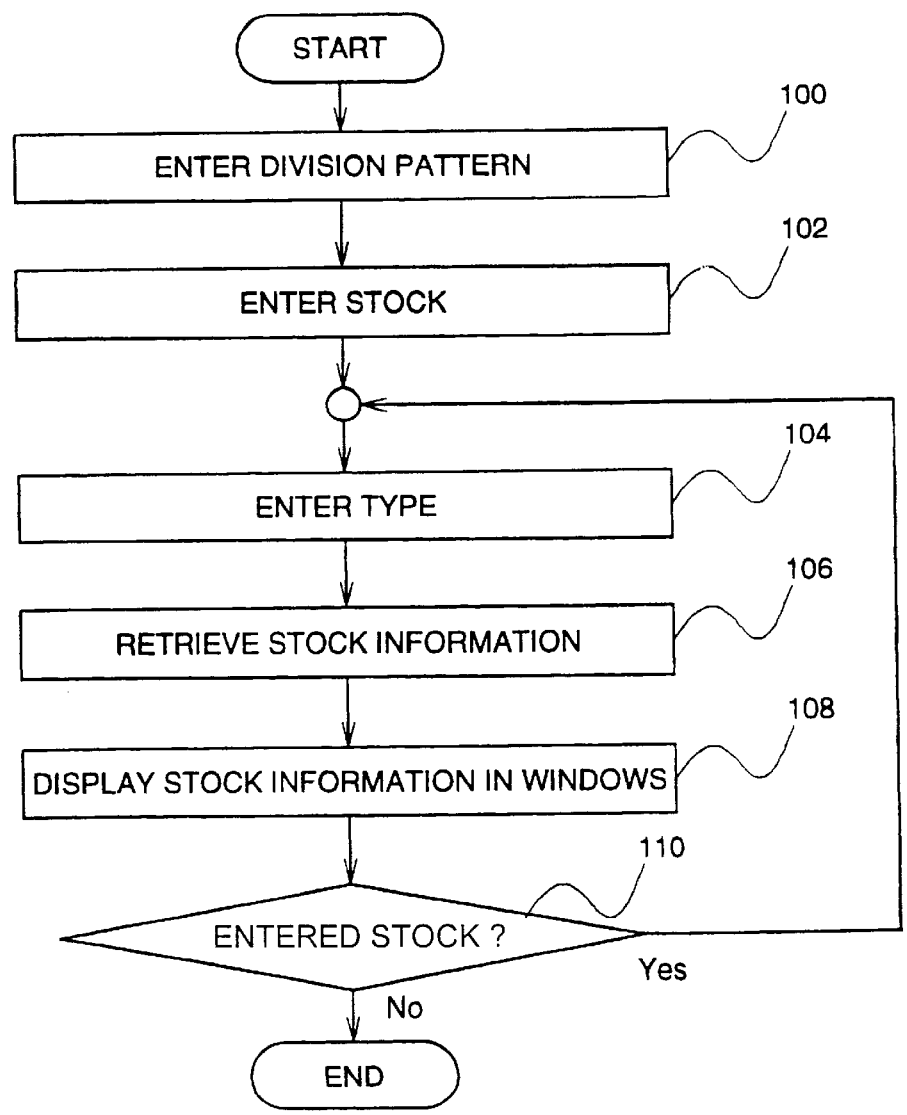

STOCK INFORMATION DISPLAY METHOD AND INFORMATION TERMINAL

BACKGROUND OF THE INVENTION

1. Field of the Invention

The present invention relates to a stock information display method for receiving dealing business data including stock prices, commodity markets, bond prices, exchange rates, corporate information and news and for displaying various types of price data and, more particularly, to a stock information display method and an information terminal for displaying a plurality of types of stock information on the same stock.

2. Description of the Related Art

Firstly, a securities information system will be described with reference to FIG. 6 which is a system block diagram showing the securities information system.

The securities information system distributes the securities information generated at a securities exchange market to securities companies located at many places. As shown in FIG. 6, it is constituted by a computer center 1, information terminals 2, and communication lines 3. The securities information gathered by the computer center 1 is supplied to the respective information terminals 2 via the communication lines 3.

The information terminals 2 receive the supplied securities information such as stock prices and store it as stock information by type and stock; they supply the stock information to a display unit in response to a user's request so as to provide the user with the information.

The stock information on one stock includes a plurality of security types including stock, CB, finance, and settlement of accounts. There has conventionally been a display method whereby a plurality of windows are opened on the same screen to display a plurality of types of information.

Referring to FIG. 7 and FIG. 8, the conventional information terminal will be described; FIG. 7 and FIG. 8 illustrate display examples in the conventional information terminal.

As shown in FIG. 7, in the conventional information terminal, when, for example, the screen is divided into four windows to display different types of information in the respective windows, the user enters the stock to be displayed and the types of information to be displayed in the respective windows. Then, the information terminal retrieves information according to the entered stock and types and displays the retrieval results in each window. The information terminal is provided in advance with the data of the screen division patterns such as a two-window pattern and a four-window pattern.

In the case of the example illustrated in FIG. 7, the stock, CB, finance, and the settlement of accounts of Company A are respectively displayed in the four windows. The user is required to enter the stock and type in each window for retrieval, meaning that the user has to repeat four inputs and retrievals. More specifically, when the user enters the stock "Company A" and the type "stock" in the top left window first, the information terminal retrieves and displays the stock information on the stock of Company A as shown in FIG. 7 in the top left screen of response to the input by the user. The same procedure for the input, retrieval, and display is taken for all the four windows as illustrated in FIG. 7.

Further, as shown in FIG. 8, even when only the stock is changed from Company A to Company B, meaning that the screen division pattern and the types of information to be displayed shown in FIG. 7 remain unchanged, the user still has to enter the stock and the types again in the respective windows to have the stock information on Company B displayed.

Referring now to FIG. 9, the processing performed by the information terminal to display the screens shown in FIG. 7 and FIG. 8 will be described. FIG. 9 is a flowchart illustrative of the processing carried out in the controller of the conventional information terminal to display a plurality of types of information on one screen.

As shown in FIG. 9, firstly, when the user enters a division pattern (100) and also enters the stock and the types of information (102, 104), the controller retrieves the stock information stored in a memory, reads the stock information which corresponds to the entered stock and types (106), and displays the retrieved information in the first window of the selected division pattern (108).

The controller further decides whether another stock has been entered (110) and if it decides that another stock has been entered, then it goes back to the processing step 104 to perform retrieval as described above according to the input and displays the result in the next window. If no further stock has been entered in the processing step 110, then the controller terminates the processing. In this manner, the processing has been conducted by the controller in the conventional information terminal.

In the display method in the conventional information terminal, however, when the screen is divided into a plurality of windows to display different types of information on one stock on one screen, the user is required to enter the stock and type for each window for retrieval, posing a problem in that the input operation is repetitious and complicated.

SUMMARY OF THE INVENTION

Accordingly, it is an object of the present invention to provide a stock information display method and an information terminal which are capable of displaying a plurality of types of stock information on a stock on the same screen by a fewer entering operation steps, thus achieving simplified input operation and greater ease of use.

To this end, according to an aspect of the present invention, there is provided a stock information display method wherein, when a screen pattern and a stock are entered, then the stock information regarding the entered stock is displayed on the display types of information specified by the entered screen pattern in accordance with a division pattern designated by the aforesaid screen pattern.

Further, according to another aspect of the present invention, there is provided a stock information display method wherein, when a screen pattern is entered, the display types of information and the division pattern are designated, and when a stock is entered, the stock information regarding the aforesaid stock is displayed on the designated display types of information in accordance with the specified division pattern.

According to still another aspect of the present invention, there is provided a stock information display method wherein, when a screen pattern is entered, the display types of information and division pattern are specified, and when a stock is entered, the stock information regarding the stock designated on the specified display types of information is displayed in accordance with the designated division pattern, and when another stock is entered, the stock information regarding another stock is displayed on the specified display types of information in accordance with the specified division pattern.

Further according to yet another aspect of the present invention, there is provided an information terminal which is equipped with a display unit for displaying stock information, an input unit through which a stock is entered, a main memory for storing stock information, a controller which reads stock information from the main memory according to a stock which has been entered through the input unit and outputs the read stock information on the display unit, and an auxiliary memory which is provided with a linkage registration table for storing a plurality of screen division patterns and display types of information to be displayed on the divided screens as screen patterns; wherein, when a particular screen pattern and a particular stock are entered through the input unit, the controller refers to the linkage registration table to read the display types of information which corresponds to the particular screen pattern, reads the stock information of the display types regarding the particular stock from the main memory, and outputs the screen information to display it on the display unit in accordance with the division pattern which corresponds to the particular screen pattern.

According to yet another aspect of the present invention, there is provided an information terminal having a controller which, when a particular screen pattern is entered through the input unit, refers to the linkage registration table to read the display types of information which corresponds to the particular screen pattern; and when a particular stock is entered through the input unit, it reads the stock information of the display types regarding the particular stock from the main memory and outputs the screen information for displaying the stock information on the display unit in accordance with the division pattern which corresponds to the particular screen pattern.

According to another aspect of the present invention, there is provided an information terminal having a controller which, when a particular screen pattern is entered and display types of information and a division pattern are designated once through the input unit, reads the stock information of the designated display types regarding the stock from the main memory and outputs the screen information on the display unit in accordance with the specified division pattern.

Thus, a user can have a plurality of types of stock information on the same screen simply by specifying a desired screen pattern and entering a desired stock, alleviating the input operation by the user.

BRIEF DESCRIPTION OF THE DRAWINGS

FIGS. 2A–2B show the schematic explanatory diagrams illustrative of screen patterns in the information terminal of the embodiment;

FIG. 8 shows an explanatory diagram illustrative of another display example in the conventional information terminal; and FIG. 9 is a flowchart illustrative of the processing for displaying a plurality of types of information on one screen which is performed by the controller of the conventional information terminal.

Description of Reference Numerals

1 Computer Center
2 Information Terminal
3 Communication Line
21 Display Unit
22 Main Memory
23 Auxiliary Memory
24 Input Unit
25 Controller
26 Linkage Registration Table

DESCRIPTION OF THE PREFERRED EMBODIMENT

An embodiment of the present invention will be described in conjunction with the accompanying drawings.

The stock information display method and an information terminal in accordance with the embodiment of the present invention are so designed that window division patterns and types of information to be displayed in respective windows are prepared in advance. This enables a user to have a plurality of types of information on a stock name displayed in the respective windows by specifying a particular screen pattern at the beginning and then simply by entering stock names thereafter.

Figure 1:
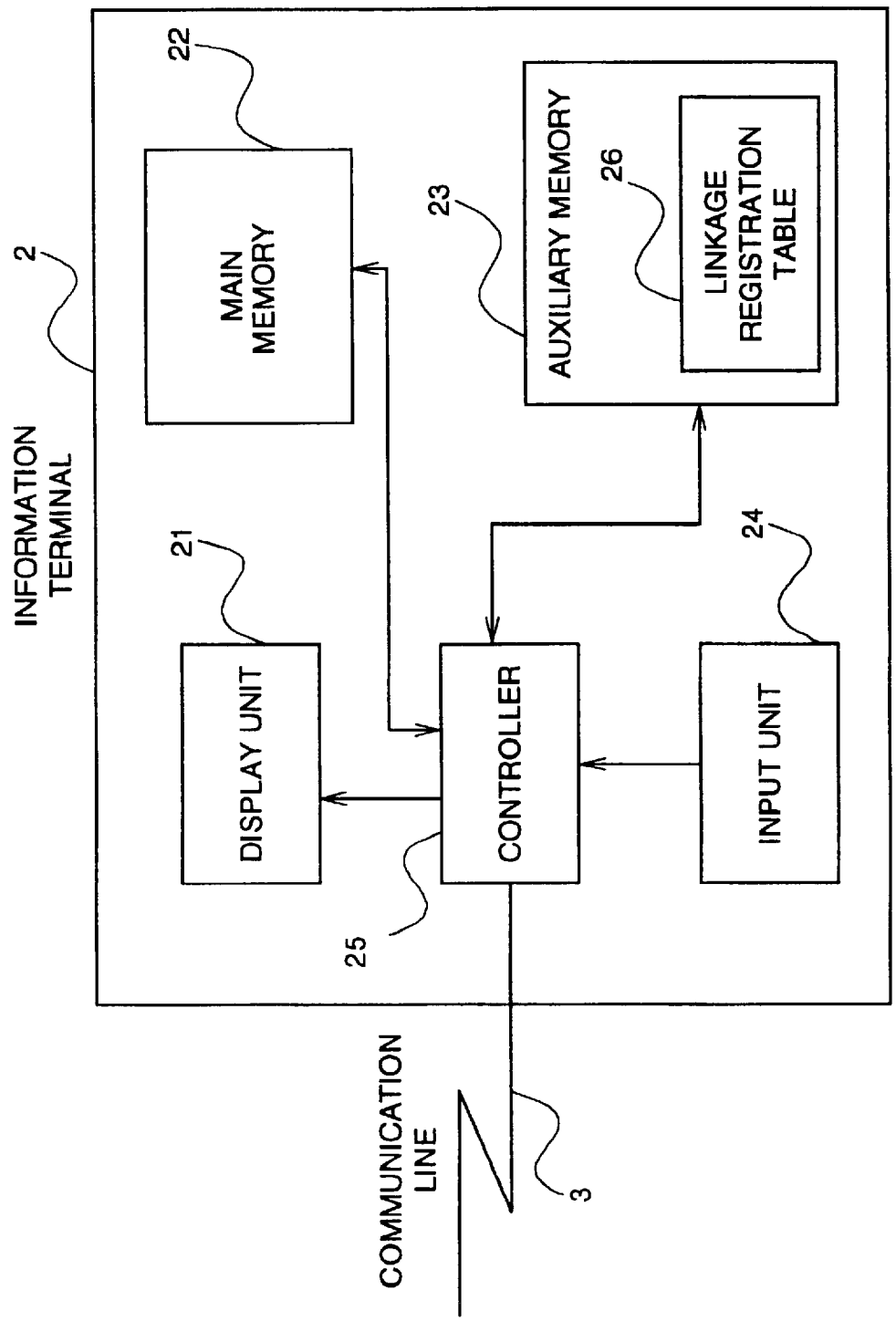
FIG. 1 is a block diagram illustrative of the configuration of an information terminal of an embodiment in accordance with the present invention.

Referring now to FIG. 1, the information terminal according to the embodiment of the present invention will be described. FIG. 1 is a block diagram showing the configuration of the information terminal related to the embodiment of the present invention.

As shown in FIG. 1, an information terminal 2 of the embodiment is constructed by a display unit 21 for displaying securities information, a main memory 22 for storing received securities information, an auxiliary memory 23 for storing screen patterns which define the types of information to be displayed and the locations to display the types of information, an input unit 24 for entering stock codes, etc., and a controller 25 for implementing the processing and control involved in the receipt and display of data. The auxiliary memory 23 is equipped with a linkage registration table 26 where display screen patterns are stored.

Of the component units, the display unit 21 and the main memory 22 are the same as those of the conventional information terminal.

The screen patterns which characterize the embodiment will be described with reference to FIG. 2 which shows schematic explanatory diagrams illustrative of the screen patterns.

The screen patterns specify the patterns on the display screens; more specifically, they designate the segmented areas where the respective types of information are to be displayed. For example, as shown in FIG. 2A, screen pattern 1 provides that the screen is divided into two windows, namely, a top window and a bottom window, and the top window displays "stock" information and the bottom window displays "CB" information. Screen pattern 2 shown in FIG. 2B provides that the screen is divided into four windows and the top left window displays "stock" information, the top right window displays "CB" information, the bottom left window displays "finance" information, and the bottom right window displays "settlement of accounts" information.

The embodiment is equipped with a linkage mode as an operating mode; when the linkage mode is engaged, a plurality of types of information regarding one stock are linked and displayed on one screen in accordance with the screen pattern specified by the user.

The respective component units of the information terminal 2 of the embodiment will now be described in detail.

Figure 3:
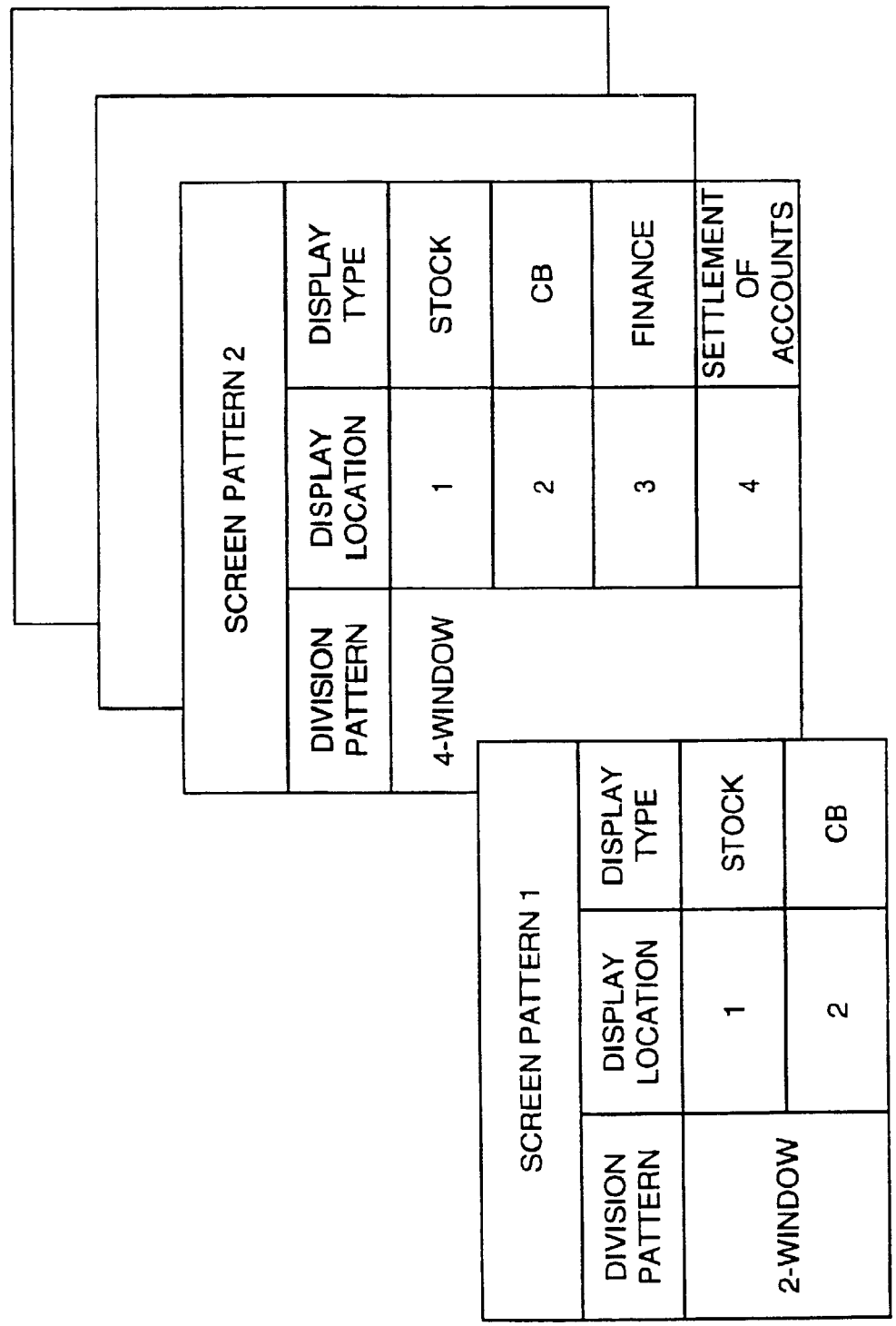
FIG. 3 is a schematic explanatory diagram illustrative of a linkage registration table 26 of the embodiment.

The linkage registration table 26 located in the auxiliary memory 23 which characterizes the embodiment will be specifically described in conjunction with FIG. 3 which is a schematic explanatory diagram of the linkage registration table 26.

As illustrated in FIG. 3, the linkage registration table 26 stores the division patterns such as the two-window pattern and the four-window pattern in relation to the display types of information for the respective display locations (windows) for each screen pattern as shown in FIG. 2.

FIG. 3 shows the linkage registration tables corresponding to the screen patterns shown in FIG. 2. To be more specific, screen pattern 1 provides that the division pattern is the two-window type, and a display location (window) 1 displays "stock" information and a display location 2 displays "CB" information; screen pattern 2 provides that the division pattern is the four-window type, and the display location 1 displays "stock" information, the display location 2 displays "CB" information, a display location 3 displays "finance" information, and a display location 4 displays "settlement of accounts" information. Other screen patterns present similar provisions.

The dividing method and the data indicating the relationship among the display locations in the respective division patterns are similar to those in the conventional information terminal; these pieces of information are stored in the auxiliary memory 23.

The input unit 24 is almost identical to the conventional one except that it is provided with a linkage key for setting the linkage mode.

When the linkage key of the input unit 24 is depressed, the controller 25 sets the linkage mode as the operating mode in a RAM or the like provided therein. In the linkage mode, when a screen pattern and a stock name are entered, the controller 25 refers to the linkage registration table 26 in the auxiliary memory 23 to display a plurality of types of information on the entered stock as specified by the screen pattern.

More specifically, as soon as the screen pattern and the stock are entered in the linkage mode, the controller 25 refers to the linkage registration table 26 to read from the main memory 22 the data of the stock of the display types of information specified by the entered screen pattern among the data of the stock which corresponds to the entered stock, and outputs it on the display unit 21 in accordance with the format of the division pattern designated by the entered screen pattern.

The controller 25 also stores the entered screen pattern in the RAM or the like, so that when another stock is entered, it reads the data of the types of stock information specified by the stored screen pattern and outputs it on the display unit 21 in accordance with the division pattern.

Thus, once the user sets the linkage mode and specifies the screen pattern, he/she can have display screens based on the specified screen pattern one after another simply by entering stocks thereafter. This feature permits a plurality of types of stock information to be displayed easily.

A brief description of how to register in the linkage registration table 26 will now be given.

When the user enters a screen pattern number, a division pattern, and the type of information to be displayed at each display location in response to a registration prompt, the controller 25 writes and registers the division pattern and the type of information to be displayed at each display location according to the entered screen pattern in the linkage registration table 26 located in the auxiliary memory 23.

In actual processing, when the division pattern is entered, the controller 25 causes the entered division pattern screen to be displayed on the display unit 21, so that the user can enter the desired types of information to be displayed in the respective windows while watching the division pattern displayed on the screen.

Thus, the registration in the linkage registration table 26 is completed.

Figure 4:
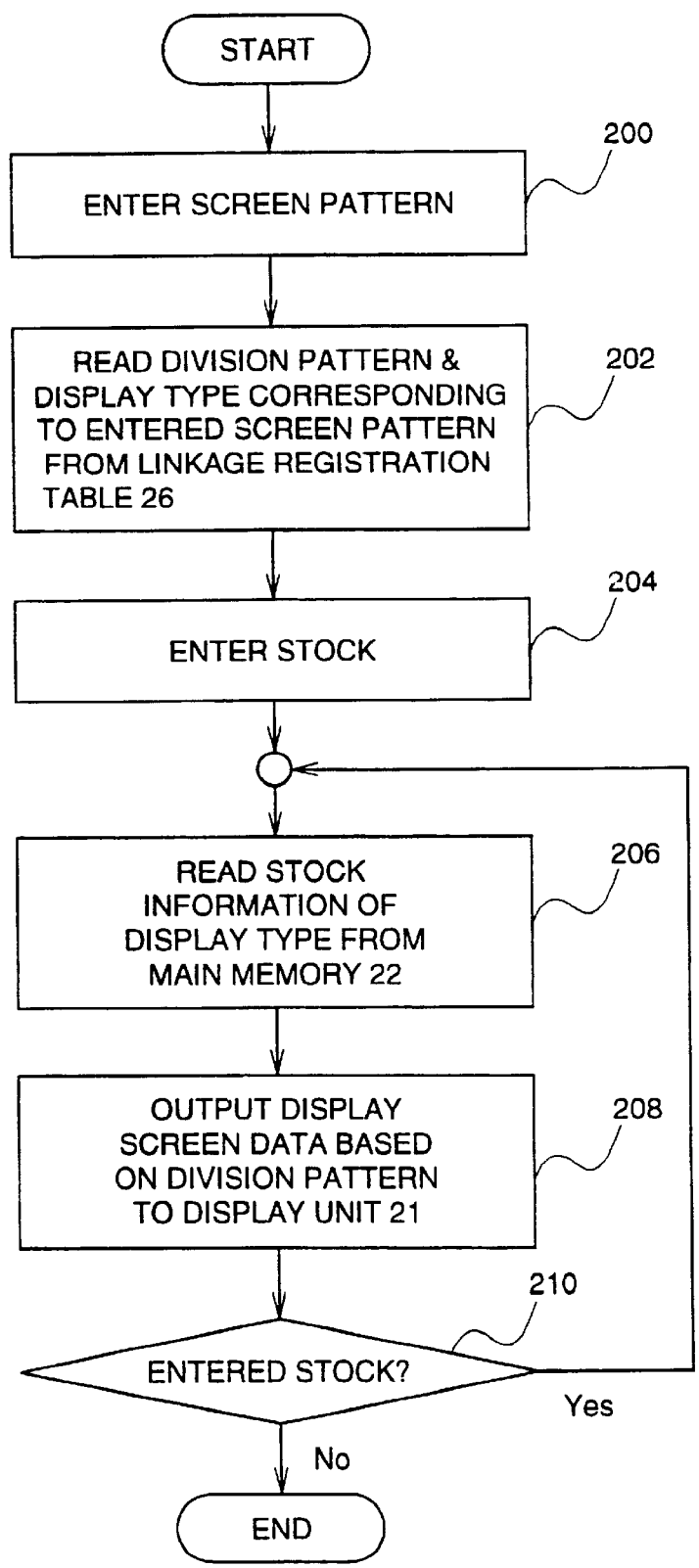
FIG. 4 is a flowchart illustrative of a retrieval processing in a controller 25 of the embodiment.

Referring now to FIG. 4, the retrieval processing carried out by the controller 25 in the linkage mode will be described. FIG. 4 shows the flowchart illustrative of the retrieval processing implemented by the controller 25 of the embodiment.

As shown in FIG. 4, when a screen pattern is entered (200), the controller 25 refers to the linkage registration table 26 in the auxiliary memory 23 and reads the division pattern and the types of information to be displayed in accordance with the entered screen pattern, then stores them in an internal RAM or the like (202). When a stock is entered (204), the controller 25 reads from the main memory 22 the stock information of the types of information to be displayed which corresponds to the entered stock (206), creates the data for the display screen in accordance with the format of the division pattern specified by the screen pattern, and supplies the created data to the display unit 21 (208).

The controller 25 further determines whether another stock has been entered (210); if it decides that another stock has been entered, then it goes to a processing step 206 where it creates the data for the display screen in a similar manner and supplies the created data to the display unit 21.

If the controller 25 decides in the processing step 210 that no further stock has been entered, then it terminates the processing. In this way, the controller 25 of the information terminal of the embodiment performs the retrieval processing.

Figure 5:
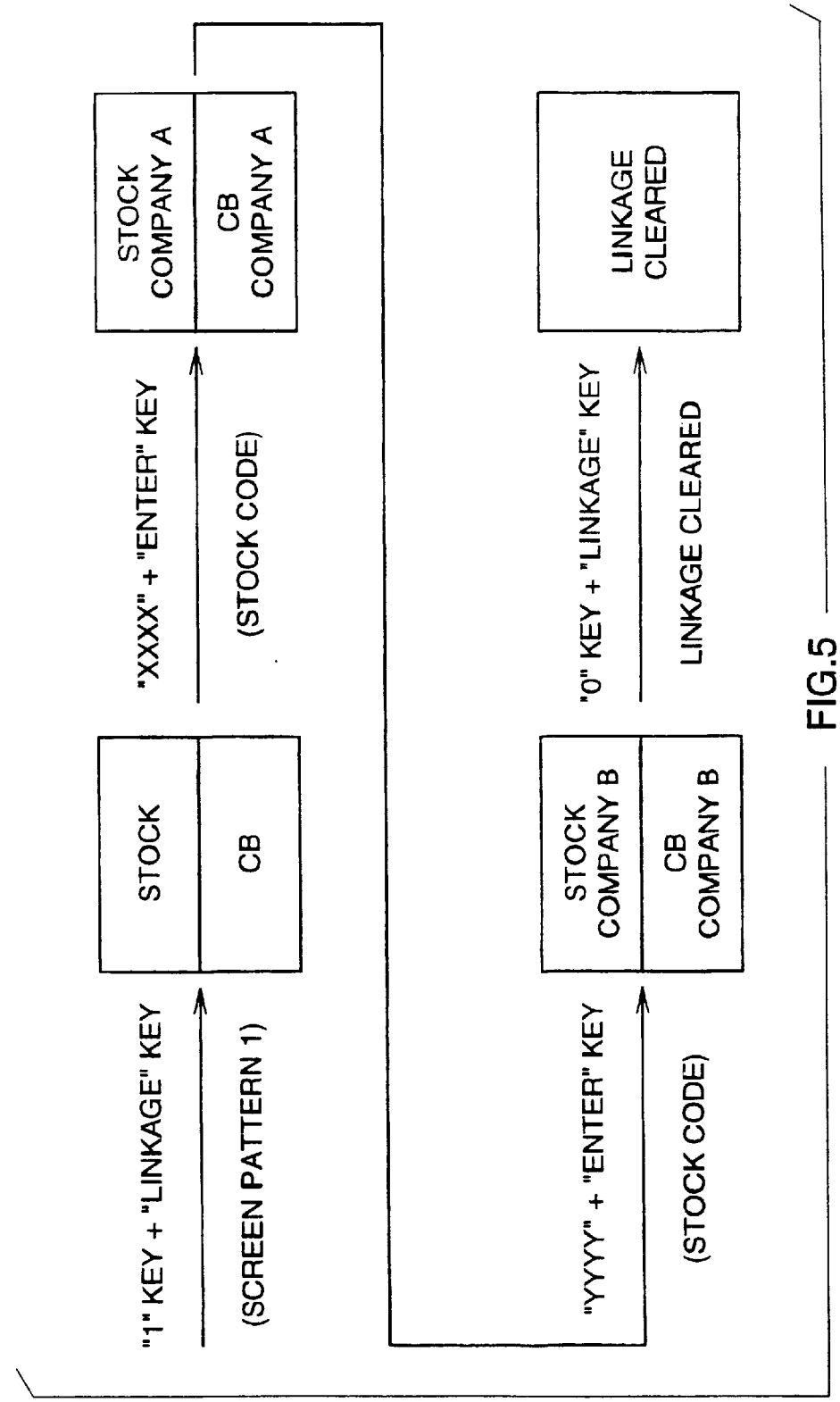
FIG. 5 shows explanatory diagrams illustrative of an input operation and a display example in the information terminal of the embodiment.
Figure 6:
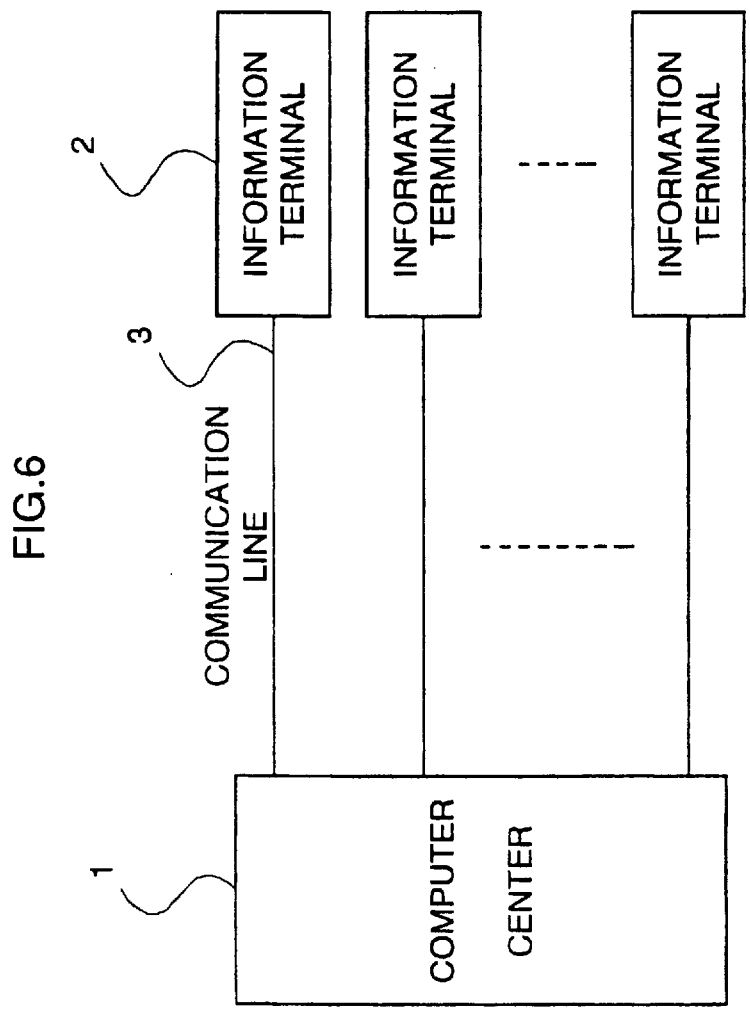
FIG. 6 is a system block diagram of a securities information system.
Figure 7:
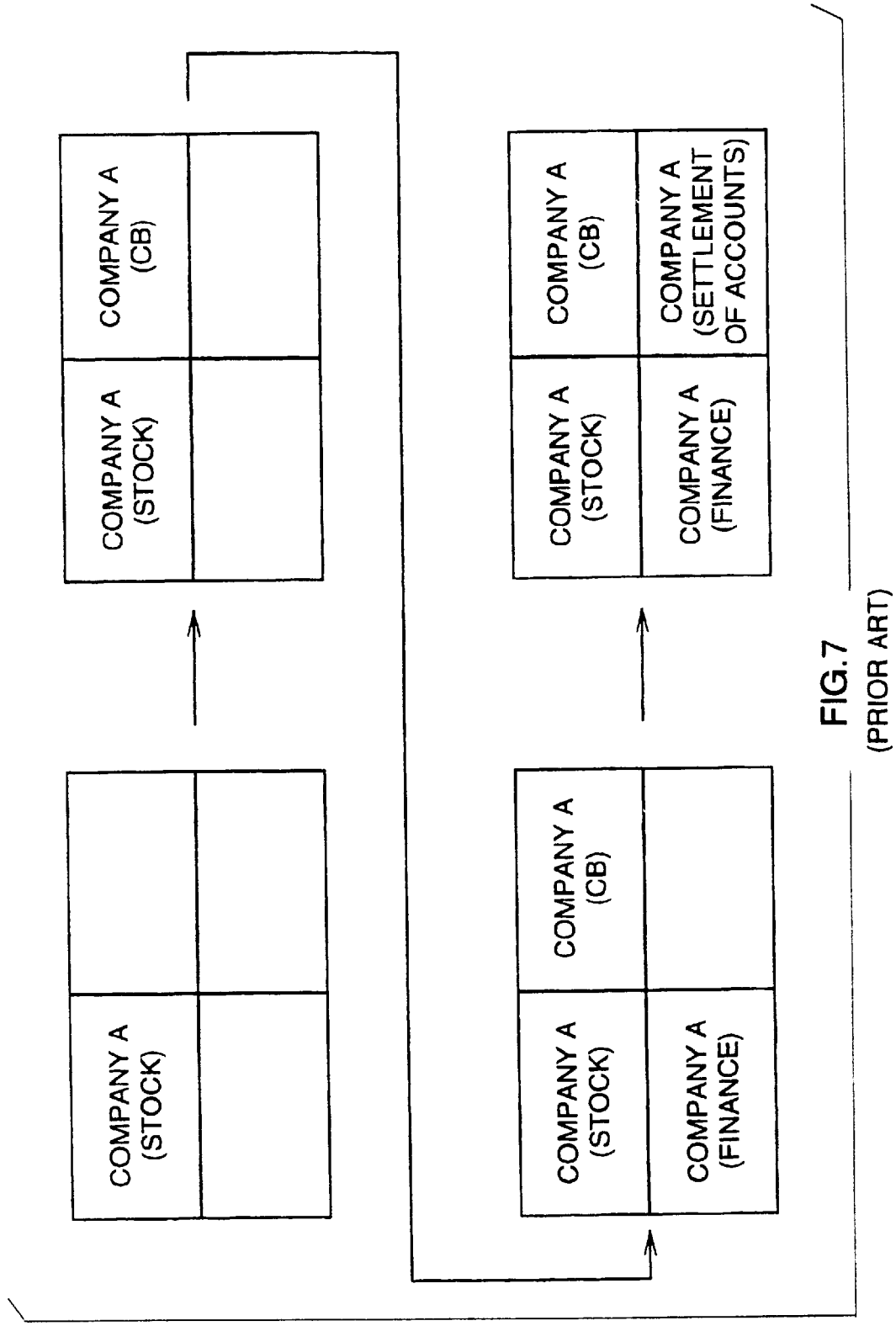
FIG. 7 shows explanatory diagrams illustrative of display examples in a conventional information terminal.

Referring now to FIG. 5, the input operation and display examples in the information terminal of the embodiment will be described in detail. FIG. 5 is an explanatory diagram illustrative of the input operation and a display example in the information terminal of the embodiment.

As shown in FIG. 5, the user depresses, for example, the "1" key to select the "screen pattern 1" as the desired screen pattern and the "linkage" key. This causes the controller 25 to set the operating mode to the linkage mode and to store the "screen pattern 1" as the screen pattern. Then, the display screen of the screen pattern is shown on the display unit 21 (top left screen of FIG. 5). As specified by the linkage registration table 26 shown in FIG. 3, the screen pattern 1 is comprised of the top window which displays the stock and the bottom window which displays the CB stock information.

Then, when the user further enters a stock code "XXXX" and presses the "ENTER" key, the controller 25 reads from the main memory 22 the data of the stock and CB stock information of the stock "Company A" which corresponds to the entered stock code "XXXX"; it creates the data for the display screen in accordance with the format of the screen pattern 1 and supplies the created data to the display unit 21 which displays it (top right screen of FIG. 5).

As the user enters another stock code "YYYY" and presses the "ENTER" key, the controller 25 reads the stock and CB data of "Company B" and has them displayed in the same manner as described above (bottom left screen of FIG. 5).

When the "0" key and the "LINKAGE" key are depressed, the controller 25 sets the operating mode back to a normal mode and displays a message saying "LINKAGE CLEARED."

According to the information terminal and the stock information display method of the embodiment, the auxiliary memory 23 is equipped with the linkage registration table 26 for storing the screen patterns and the corresponding division patterns and the types of information to be displayed at the respective display locations. When a desired screen pattern and stock are entered, the controller 25 reads from the main memory 22 the stock information of the display types corresponding to the entered screen pattern, creates the display data in accordance with the format of the division pattern based on the screen pattern, and supplies the created data to the display unit 21. Hence, once the user has entered the desired screen pattern, he/she has only to enter stocks thereafter to have a plurality of types of information displayed on the same screen. This provides an advantage of markedly alleviated entering operation and greater ease of operation.

What is claimed is:

1. A stock information display method comprising:

storing a screen pattern having a set of division pattern which specifies a divided form of a screen, and a display type which specifies items of stock, when a command which specifies a particular screen pattern is entered, a display type and division pattern are specified by said particular screen pattern, and when a first stock is entered, stock information regarding said first stock on said specified display type is displayed in accordance with a division pattern, which corresponds to a screen to be displayed which is specified by said particular screen pattern, and when a second stock is entered, in accordance with a division pattern which corresponds to a screen to be displayed which is specified by said specified division pattern, stock information regarding said second stock is displayed on said specified display type, and when a command which specifies another particular screen pattern is entered, another display type and another division pattern is specified, and displays stock information of said second stock on said another screen pattern, at the display location which is specified by said another screen pattern in accordance with said another division pattern.

2. An information terminal comprising:

a display unit for displaying stock information;

an input unit for entering a stock;

a main memory for storing stock information;

a controller which reads stock information from said main memory according to a stock which has been entered through said input unit and outputs the read stock information to said display unit; and an auxiliary memory which is provided with a linkage registration table for storing a plurality of screen division patterns which specifies a screen division form and display types which specifies a stock corresponding to a screen to be displayed in divided screens as screen patterns; wherein, when a command which designates a particular screen pattern is entered through said input unit, said controller refers to said linkage registration table to read a display type which corresponds to a screen to be displayed which is specified by said particular screen pattern;

when a first stock is entered through said input unit, said controller reads stock information of said display type regarding said first stock from said main memory, and outputs screen information to display said stock information on said display unit in accordance with a division pattern which corresponds to a screen to be displayed which is specified by said particular screen pattern; and when a second stock is entered through said input unit, said controller reads stock information of said display type regarding said second stock from said main memory, and outputs screen information to display said stock information on said display unit in accordance with a division pattern which corresponds to a screen to be displayed which is specified by said particular screen pattern; and when a command which designates another particular screen pattern is entered through said input unit, said controller refers to said linkage registration table to read a display type which corresponds to a screen to be displayed which is specified by said another particular screen pattern, and reads stock information of said display type regarding said second stock from said main memory, and outputs screen information to display said stock information on said display unit in accordance with a division pattern which corresponds to a screen to be displayed which is specified by said another particular screen pattern.

3. An information terminal according to claim 2, wherein the screen pattern is a divided pattern which is comprised of two screen segments, namely, an upper screen segment and a lower screen segment, and which is equipped with items "Stock" and "CB" as the display types; wherein the upper screen segment, which is an upper window, displays "Stock" information, while the lower screen segment, which is a lower window, displays "CB" information.

4. An information terminal according to claim 2, wherein the screen pattern is a divided pattern which is comprised of four screen segments, and which is equipped with items "Stock," "CB," "Finance," and "Settlement of Accounts" as the display types; wherein a top left screen segment, which is a top left window, displays "Stock" information, a top right screen segment, which is a top right window, displays "CB" information, a bottom left screen segment, which is a bottom left window, displays "Finance" information, and a bottom right screen segment, which is a bottom right window, displays "Settlement of Accounts" information.

* * * * *